United States Patent
Fukuda

(10) Patent No.: US 10,466,628 B1
(45) Date of Patent: Nov. 5, 2019

(54) FIXING BELT, FIXING DEVICE, PROCESS CARTRIDGE, AND IMAGE FORMING APPARATUS

(71) Applicant: FUJI XEROX CO., LTD., Tokyo (JP)

(72) Inventor: Shigeru Fukuda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/355,869

(22) Filed: Mar. 18, 2019

(30) Foreign Application Priority Data

Sep. 26, 2018 (JP) ................. 2018-179871

(51) Int. Cl.
| | | |
|---|---|---|
| *G03G 15/20* | (2006.01) | |
| *C08L 79/08* | (2006.01) | |
| *C08K 3/04* | (2006.01) | |
| *B32B 27/28* | (2006.01) | |
| *C08J 9/28* | (2006.01) | |

(52) U.S. Cl.
CPC ....... *G03G 15/2003* (2013.01); *B32B 27/281* (2013.01); *C08J 9/286* (2013.01); *C08K 3/042* (2017.05); *C08L 79/08* (2013.01); *B32B 2307/302* (2013.01); *B32B 2307/51* (2013.01); *B32B 2433/04* (2013.01); *C08J 2201/0482* (2013.01); *C08J 2201/0502* (2013.01); *C08J 2205/052* (2013.01); *C08J 2379/08* (2013.01); *C08L 2203/14* (2013.01); *G03G 2215/2038* (2013.01)

(58) Field of Classification Search
CPC ........... G03G 15/2003; G03G 15/2057; G03G 2215/2038; B23B 27/281; B23B 2307/51; B23B 2433/04; C08J 9/286; C08J 2201/0482; C08J 2201/0502; C08J 2205/052; C08J 2379/08; C08K 3/042; C08L 79/08; C08L 2203/14
See application file for complete search history.

(56) References Cited

U.S. PATENT DOCUMENTS

| | | | | |
|---|---|---|---|---|
| 7,010,255 | B2 * | 3/2006 | Yura | G03G 15/2017 399/328 |
| 2007/0065193 | A1 * | 3/2007 | Jang | G03G 15/206 399/329 |
| 2010/0014897 | A1 * | 1/2010 | Seto | G03G 15/22 399/307 |
| 2010/0190100 | A1 * | 7/2010 | Kelly | G03G 15/2057 430/84 |
| 2010/0303520 | A1 * | 12/2010 | Miyauchi | C08G 73/10 521/50 |
| 2011/0318077 | A1 * | 12/2011 | Mukoyama | G03G 15/2057 399/333 |
| 2014/0127513 | A1 * | 5/2014 | Nakajima | C08K 3/04 428/411.1 |
| 2019/0018349 | A1 * | 1/2019 | Murakami | G03G 15/206 |

FOREIGN PATENT DOCUMENTS

| | | | |
|---|---|---|---|
| JP | 2007298814 | | 11/2007 |
| JP | 2008052201 | A * | 3/2008 |
| JP | 5233129 | | 7/2013 |
| JP | 5588434 | | 9/2014 |
| JP | 2017173422 | A * | 9/2017 |
| WO | 2010137728 | | 12/2010 |

* cited by examiner

*Primary Examiner* — David J Bolduc
(74) *Attorney, Agent, or Firm* — JCIPRNET

(57) ABSTRACT

A fixing belt includes a base composed of a foamed resin layer which contains a flat-shaped heat transfer agent and whose thermal conductivity in a direction of the thickness of the belt is 0.5 W/(m·K) or more.

14 Claims, 6 Drawing Sheets

FIXING BELT, FIXING DEVICE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2018-179871 filed Sep. 26, 2018.

BACKGROUND

(i) Technical Field

The present disclosure relates to a fixing belt, to a fixing device, to a process cartridge, and to an image forming apparatus.

(ii) Related Art

In electrophotographic image forming apparatuses (such as copiers, facsimiles, and printers), an unfixed toner image formed on a recording medium is fixed in a fixing device to form an image.

Japanese Unexamined Patent Application Publication No. 2007-298814 discloses "a fixing belt including a polyimide resin layer, wherein the polyimide resin layer includes closed cells, and wherein the thermal conductivity of the belt is 0.5 W/(m·K) or less."

Japanese Patent No. 5233129 discloses "a heating roller including: a heater serving as a heat source; a metallic cylindrical core in contact with the heater; a heating member disposed on the outer surface of the core and used to heat and pressurize a toner image supported on a recording medium to fix the toner image, wherein the heating member is formed from silicone rubber, wherein pores are provided in the silicone rubber, wherein pitch-based carbon fibers having a length of from 50 to 150 μm and longer than the spacing of the pores are disposed in the silicone rubber present between the pores, and wherein the carbon fibers are in contact with each other in regions between the pores and form heat conduction paths in directions extending from the heater toward the outer surface of the heating member."

Japanese Patent No. 5588434 discloses "a transfer or fixing member used for an image forming apparatus, wherein the transfer or fixing member uses a resin composition having a porous structure in which 80% or more of the pores are closed pores, wherein the average diameter of the pores is from 0.01 μm to 0.9 μm inclusive, and wherein 80% or more of the pores have a pore diameter within ±30% of the average diameter of the pores."

SUMMARY

Aspects of non-limiting embodiments of the present disclosure relate to a fixing belt whose thermal conductivity in the direction of its thickness is higher than that of a fixing belt including a base composed of an unfoamed resin layer containing a flat-shaped heat transfer agent.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a fixing belt including a base composed of a foamed resin layer which contains a flat-shaped heat transfer agent and whose thermal conductivity in a direction of the thickness of the belt is 0.5 W/(m·K) or more.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described.

Members having substantially the same functions will be denoted by the same numerals in all the figures, and repeated descriptions may be appropriately omitted.

[Fixing Member (Fixing Belt)]

A fixing member (fixing belt) according to an exemplary embodiment will be described.

Figure 1:
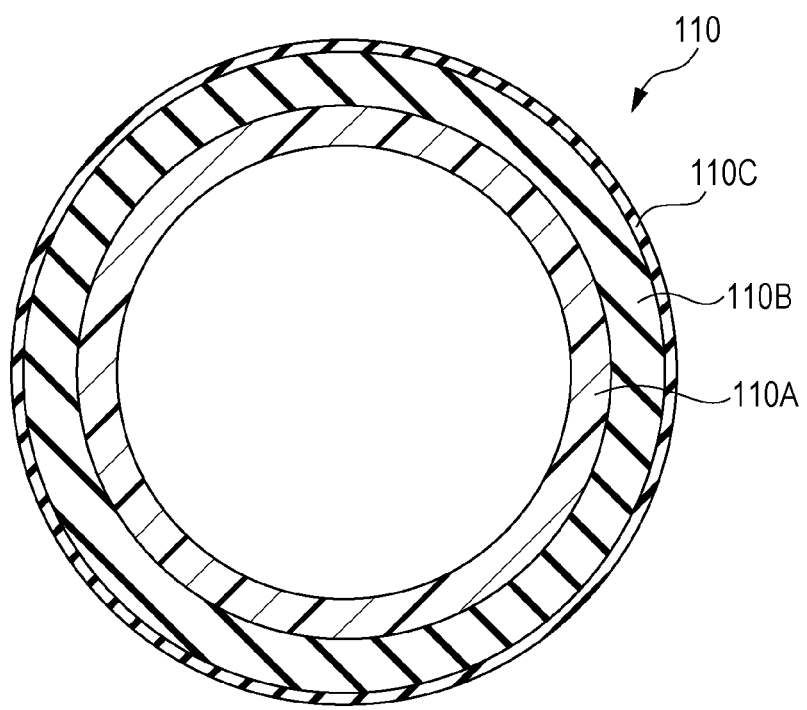
FIG. 1 is a schematic cross-sectional view showing an example of a fixing member (fixing belt) according to an exemplary embodiment.

FIG. 1 is a schematic cross-sectional view showing an example of the fixing belt according to the present exemplary embodiment.

As shown in FIG. 1, a fixing belt 110 according to the present exemplary embodiment includes, for example, a base 110A, an elastic layer 110B disposed on the base 110A, and a surface layer 110C disposed on the elastic layer 110B.

The base 110A is composed of a foamed resin layer which contains a flat-shaped heat transfer agent and whose thermal conductivity in the direction of the thickness of the belt is 0.5 W/(m·K) or more.

The fixing belt 110 according to the present exemplary embodiment has the structure described above. Therefore, the thermal conductivity of the fixing belt in the direction of the thickness of the belt is high. The reason for this may be as follows.

The fixing belt is required to have good thermal conduction properties (high thermal conductivity in the thickness direction) in order to achieve a reduction in heating time, a reduction in power consumption, an increase in fixing speed, etc.

One known method for increasing the thermal conductivity (the thermal conductivity in the thickness direction) of the base in the fixing belt is to align a flat-shaped heat transfer agent in the base. However, there is a strong tendency of the flat-shaped heat transfer agent in the base to align in plane directions of the base (directions orthogonal to the thickness direction). Therefore, at present, it is difficult to improve the thermal conductivity of the base in its thickness direction.

The base 110A of the fixing belt 110 is composed of the foamed resin layer, and the foamed resin layer contains the flat-shaped heat transfer agent. When cells are present in the resin layer, the flat-shaped heat transfer agent tends to align along wall surfaces of the cells. This results in an increase in the ratio of the flat-shaped heat transfer agent aligned in the direction of the base thickness in the base 110A composed of the foamed resin layer. Therefore, the thermal conductivity of the base 110A in the direction of the belt thickness increases to 0.5 W/(m·K) or more. The thermal conductivity of the fixing belt 110 in its thickness direction increases accordingly.

It can therefore be inferred that, in the fixing belt 110 according to the present exemplary embodiment, its thermal conductivity in the direction of the belt thickness is high.

In the fixing belt 110 according to the present exemplary embodiment, the ratio of the flat-shaped heat transfer agent aligned in the direction of the base thickness in the base 110A composed of the foamed resin layer increases as described above. Specifically, a small amount of the flat-shaped heat transfer agent can increase the thermal conductivity of the base 110A in the direction of the belt thickness. Therefore, the thermal conductivity of the base 110A increases, and at the same time the folding endurance of the base 110A increases. The folding endurance of the fixing belt 110 increases accordingly.

No particular limitation is imposed on the layer structure of the fixing belt 110 according to the present exemplary embodiment, so long as it has the base 110A.

Examples of the layer structure of the fixing belt 110 according to the present exemplary embodiment include: a layer structure optionally including a metal layer and a protective layer therefor that are interposed between the base 110A and the elastic layer 110B; a layer structure including a bonding layer interposed between the base 110A and the elastic layer 110B; a layer structure including a bonding layer interposed between the elastic layer 110B and the surface layer 110C; a layer structure including no elastic layer 110B; a layer structure including no surface layer 110C; and combinations of these layer structures.

The structural elements of the fixing belt 110 according to the present exemplary embodiment will be described in detail. In the following description, the numerals will be omitted.

(Base)

The base is composed of the foamed resin layer containing the flat-shaped heat transfer agent.

—Flat-Shaped Heat Transfer Agent—

The flat-shaped heat transfer agent is a heat transfer agent with an aspect ratio (the ratio of its major axis to its thickness) of 10 or more.

Specifically, the flat-shaped heat transfer agent may be at least one of graphene and graphite (natural graphite and artificial graphite). Of these, from the viewpoint of thermal conductivity and folding endurance, graphene is preferable as the flat-shaped heat transfer agent.

One flat-shaped heat transfer agent may be used alone, or two or more flat-shaped heat transfer agents may be used in combination.

From the viewpoint of improving the thermal conductivity and folding endurance, the major axis of the flat-shaped heat transfer agent is preferably from 0.1 μm to 5 μm inclusive and more preferably from 0.1 μm to 3 μm inclusive.

The major axis of the flat-shaped heat transfer agent means its longest diameter in plan view (when the flat-shaped heat transfer agent is viewed in its thickness direction).

The thickness of the flat-shaped heat transfer agent means its largest thickness.

The major axis and thickness of the flat-shaped heat transfer agent are obtained by measuring the major axes and thicknesses of 100 heat transfer agent particles observed and collected from the foamed resin layer (base) and arithmetically averaging the major axes and thicknesses of the heat transfer agent particles.

From the viewpoint of improving the thermal conductivity and folding endurance, the content of the flat-shaped heat transfer agent based on the mass of the base (foamed resin layer) is preferably from 30% by mass to 65% by mass inclusive and more preferably from 35% by mass to 60% by mass inclusive.

—Resin in Foamed Resin Layer—

Examples of the resin in the foamed resin layer include polyimide-based resins, polyamide resins, polybenzimidazole (PBI) resins, polyether ether ketone (PEEK) resins, polysulfone (PSU) resins, polyether sulfone (PES) resins, polyphenylene sulfide (PPS) resins, polyetherimide (PEI) resins, and wholly aromatic polyester resins (liquid crystal polymers).

One resin may be used alone in the foamed resin layer, or two or more resins may be used in combination.

Of these, the resin in the foamed resin layer is preferably a polyimide-based resin from the viewpoint of improving the thermal conductivity and folding endurance. Specifically, the foamed resin layer is preferably a foamed polyimide-based resin layer.

The polyimide-based resin is preferably a polyimide resin, a polyamide-imide resin, a polyetherimide resin, etc. and more preferably a polyimide resin or a polyamide-imide resin.

A description will be given of the polyimide resin.

Examples of the polyimide resin include imidized products of polyamide acids (polyamic acids) that are polymerized products of tetracarboxylic dianhydride and diamine compounds. A specific example of the polyimide resin is a product obtained by subjecting equimolar amounts of tetracarboxylic dianhydride and a diamine compound to a polymerization reaction in a solvent to obtain a polyamide acid solution and subjecting the polyamide acid solution to imidization.

One example of the polyimide resin is a resin having a constituent unit represented by the following general formula (I).

General formula (1)

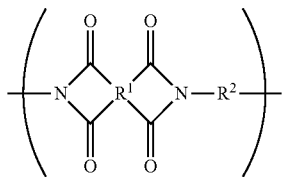

In general formula (I), $R^1$ is a tetravalent organic group and is an aromatic group, an aliphatic group, an alicyclic group, a combination of an aromatic group and an aliphatic group, or any of the above groups substituted by a substituent (e.g., a residue of tetracarboxylic dianhydride described later). $R^2$ is a divalent organic group and is an aromatic group, an aliphatic group, an alicyclic group, a combination of an aromatic group and an aliphatic group, or any of the above groups substituted by a substituent (e.g., a residue of a diamine compound described later).

Specific examples of the tetracarboxylic dianhydride include pyromellitic dianhydride, 3,3', 4,4'-benzophenonetetracarboxylic dianhydride, 3,3', 4,4'-biphenyltetracarboxylic dianhydride, 2,3,3', 4-biphenyltetracarboxylic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 2,2'-bis(3,4-dicarboxyphenyl)sulfonic dianhydride, perylene-3,4,9,10-tetracarboxylic dianhydride, bis(3,4-dicarboxyphenyl)ether dianhydride, and ethylene tetracarboxylic dianhydride.

Specific examples of the diamine compound include 4,4'-diaminodiphenyl ether, 4,4'-diaminodiphenylmethane, 3,3'-diaminodiphenylmethane, 3,3'-dichlorobenzidine, 4,4'-diaminodiphenyl sulfide, 3,3'-diaminodiphenyl sulfone, 1,5-diaminonaphthalene, m-phenylenediamine, p-phenylenediamine, 3,3'-dimethyl-4,4'-biphenyldiamine, benzidine, 3,3'-dimethylbenzidine, 3,3'-dimethoxybenzidine, 4,4'-diaminodiphenyl sulfone, 4,4'-diaminodiphenylpropane, 2,4-bis(β-amino-tert-butyl)toluene, bis(p-β-amino-tert-butylphenyl) ether, bis(p-(3-methyl-8-aminophenyl)benzene, bis-p-(1,1-dimethyl-5-amino-pentyl)benzene, 1-isopropyl-2,4-m-phenylenediamine, m-xylylenediamine, p-xylylenediamine, di(p-aminocyclohexyl)methane, hexamethylenediamine, heptamethylenediamine, octamethylenediamine, nonamethylenediamine, decamethylenediamine, diaminopropyltetramethylene, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N(CH_2)_3O(CH_2)_2O(CH_2)NH_2$, $H_2N(CH_2)_3S(CH_2)_3NH_2$, and $H_2N(CH_2)_3N(CH_3)_2(CH_2)_3NH_2$.

The solvent used when the tetracarboxylic dianhydride is reacted with the diamine may be a polar solvent (organic polar solvent) from the viewpoint of solubility etc. The polar solvent may be, for example, N,N-dialkylamides. Specific examples of the polar solvent include low-molecular weight polar solvents such as N,N-dimethylformamide, N,N-dimethylacetamide, N,N-diethylformamide, N,N-diethylacetamide, N,N-dimethylmethoxyacetamide, dimethyl sulfoxide, hexamethylphosphortriamide, N-methyl-2-pyrrolidone, pyridine, tetramethylene sulfone, and dimethyltetramethylene sulfone. These may be used alone or in combination of two or more.

In particular, the polyimide resin may be a polyimide resin (BPDA-ODA) formed from 3,3',4, 4'-biphenyltetracarboxylic dianhydride and 4,4'-diaminodiphenyl ether or a polyimide resin (BPDA-PDA) formed from 3,3',4, 4'-biphenyltetracarboxylic dianhydride and p-phenylenediamine from the viewpoint of durability, thermal conduction properties, and inner surface slidability.

A description will be given of the polyamide-imide resin.

One example of the polyamide-imide resin is a polyamide-imide resin obtained by subjecting a polyamide-polyamic acid resin, which is a condensation product of a tricarboxylic acid and a diamine compound, to a cyclodehydration reaction. Specific Examples of the polyamide-imide resin include:

(1) a polyamide-imide resin obtained by a method including subjecting equimolar amounts of a tricarboxylic anhydride and a diamine to polycondensation and imidization (cyclodehydration) reactions in an organic polar solvent at high temperature in the presence of a dehydration catalyst;

(2) a polyamide-imide resin obtained by a method including subjecting equimolar amounts of a tricarboxylic anhydride monochloride and a diamine to polycondensation and imidization reactions in an organic polar solvent at low temperature; and (3) a polyamide-imide resin obtained by a method including subjecting a tricarboxylic anhydride and a diisocyanate to polycondensation and imidization reactions in an organic polar solvent at high temperature.

The polyamide-imide resin is formed by adding a polyamide-polyamic acid resin, which is a precursor of a polyimide resin, to a coating solution before the imidization reaction, applying the coating solution, and then subjecting the polyamide-polyamic acid resin to the imidization reaction.

Examples of the tricarboxylic anhydride include trimellitic anhydride and trimellitic anhydride monochloride.

Examples of the diamine compound include diamine compounds used to synthesize polyamic acids. In particular, aromatic diamine compounds may be used.

Examples of the aromatic diamine compounds include 3,3'-diaminobenzophenone, p-phenylenediamine, 4,4'-diaminodiphenyl, 4,4'-diaminodiphenylamide, 4,4'-diaminodiphenylmethane, 4,4'-diaminodiphenyl ether, bis[4-{3-(4-aminophenoxy)benzoyl}phenyl]ether, 4,4'-bis(3-aminophenoxy)biphenyl, bis[4-(3-aminophenoxy)phenyl]sulfone, and 2,2'-bis[4-(3-aminophenoxy)phenyl]propane.

One example of the diisocyanate compound is a diisocyanate compound in which the two amino groups in a diamine compound used to synthesize a polyamic acid are substituted with isocyanate groups. In particular, aromatic diisocyanate compounds may be used.

Examples of the diisocyanate compounds include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, and 2,2'-dimethoxybiphenyl-4,4'-diisocyanate.

Other examples of the diisocyanate compounds include diisocyanate compounds with the isocyanate groups stabilized by a blocking agent. No particular limitation is imposed on the blocking agent, and examples of the blocking agent include alcohols, phenols, and oximes.

Examples of a method for foaming the resin layer (particularly the polyimide-based resin layer) include:

(1) a method including adding a foaming agent to a polyimide resin precursor solution, removing a solvent by drying to foam the polyimide resin precursor, and subjecting the foamed polyimide resin precursor to imidization; and (2) a method including adding a high-boiling point solvent to a polyimide resin precursor solution and then foaming the polyimide resin precursor at the vapor pressure of the high-boiling point solvent during imidization.

—Additional Additives in Foamed Resin Layer—

The foamed resin layer may contain additional additives.

The additional additives used may be well-known additives, and examples thereof include: dispersants for improving the dispersibility of the flat-shaped heat transfer agent; various fillers for imparting various functions such as mechanical strength; catalysts for facilitating the imidization reaction; leveling agents for improving the quality of a film product; and parting materials for improving releasability (e.g., fluorocarbon resin particles such as polytetrafluoroethylene (PTFE) particles, tetrafluoroethylene-perfluoroalkyl vinyl ether copolymer (PFA) particles, and tetrafluoroethylene-hexafluoropropylene copolymer (FEP) particles).

—Properties of Foamed Resin Layer (Base)—

The "thermal conductivity of the foamed resin layer (base) in the direction of the belt thickness" is 0.5 W/(m·K) or more. The thermal conductivity is preferably more than 0.5 W/(m·K), more preferably 0.75 W/(m·K) or more, and still more preferably 1.0 W/(m·K) or more.

The thermal conductivity in the direction of the belt thickness is measured as follows. The measurement environment is a room-temperature normal-humidity environment (25° C./50%).

A measurement specimen is placed on a probe of the ai-Phase Mobile (manufactured by ai-Phase Co., Ltd.) such that the thermal conductivity in the direction of the belt thickness (i.e., the direction of the thickness of the base) can be measured.

After the placement of the measurement specimen, a weight of 50 gf is placed thereon, and the thermal conductivity is measured three times in a manual mode under the conditions of 1.41 V for a measurement time of 2 seconds in 10 divisions in the range of 3 Hz to 100 Hz.

The arithmetic mean of the three measurements is used as the "thermal conductivity of the foamed resin layer (i.e., the base) in the direction of the belt thickness."

From the viewpoint of improving the thermal conductivity and folding endurance, the foaming ratio of the foamed resin layer (base) is preferably from 30% to 65% inclusive and more preferably from 35% to 60% inclusive.

The foaming ratio of the foamed resin layer (base) is measured by the following method.

A measurement specimen of the foamed resin layer (base) is obtained from the fixing belt.

Platinum is evaporated onto a surface of the obtained measurement specimen (a cross section cut in the direction of the thickness of the base), and the surface is observed under a scanning electron microscope (JSM-6700 manufactured by JEOL Ltd.) at 5,000× to determine the area of void portions.

Next, the foaming ratio of the foamed resin layer (base) is computed using the formula: foaming ratio of foamed resin layer (base)=area of void portions determined/area of observation region×100.

This procedure is repeated for five measurement specimens, and the arithmetic mean of the five measurements is used as the foaming ratio of the foamed resin layer (base).

From the viewpoint of improving the thermal conductivity and folding endurance, the foamed resin layer (base) may be a closed-cell foamed resin layer. The closed-cell foamed resin layer means that the ratio of closed cells is 5% or more.

From the viewpoint of improving the thermal conductivity and folding endurance, the ratio of closed cells in the closed-cell foamed resin layer is preferably 80% or more and more preferably 90% or more.

The ratio of closed cells in the foamed resin layer (base) is measured by the following method.

A measurement specimen of the foamed resin layer (base) is obtained from the fixing belt.

Next, platinum is evaporated onto a surface of the measurement specimen obtained, and the surface is observed under a scanning electron microscope (JSM-6700 manufactured by JEOL Ltd.) at a magnification of 5,000× to measure the shapes of 100 cells in the cross section.

This procedure is repeated for three measurement specimens, and the arithmetic mean of the 300 measurements is used as the ratio of closed cells in the foamed resin layer.

As for the folding endurance of the foamed resin layer (base), its fold number is preferably 2,500 or more and more preferably 10,000 or more.

The fold number of the foamed resin layer (base) is measured by a method described in folding endurance (fold number) in [Examples] described later. The measurement environment is a room-temperature normal-humidity environment (25° C./50%).

Cells for holding oil may be exposed at the inner circumferential surface of the foamed resin layer (base). When the exposed cells hold the oil, the frictional force on the inner circumferential surface of the fixing belt is reduced, and its slidability is improved.

From the viewpoint of improving the slidability of the inner circumferential surface of the fixing belt, the foamed resin layer (base) may be of the closed cell type, and cells for holding oil may be exposed at the inner circumferential surface.

From the viewpoint of improving the thermal conductivity and folding endurance, the thickness of the foamed resin layer (base) is preferably from 30 μm to 200 μm inclusive, more preferably from 50 μm to 150 μm inclusive, and particularly preferably from 70 μm to 120 μm inclusive.

(Elastic Layer)

The fixing belt according to the present exemplary embodiment may include the elastic layer disposed on the base layer.

No particular limitation is imposed on the heat-resistant elastic material, and a rubber material is used preferably. More preferably, the elastic layer contains, for example, silicone rubber.

Examples of the silicone rubber include RTV silicone rubber, HTV silicone rubber, and liquid silicone rubber. Specific examples of the silicone rubber include polydimethyl silicone rubber (MQ), methylvinyl silicone rubber (VMQ), methylphenyl silicone rubber (PMQ), and fluorosilicone rubber (FVMQ).

The elastic layer may contain various additives. Examples of the additives include softening agents (such as paraffin-based softening agents), processing aids (such as stearic acid), antioxidants (such as amine-based antioxidants), vulcanizing agents (such as sulfur, metal oxides, and peroxides), and functional fillers (such as alumina).

The thickness of the elastic layer is preferably from 30 μm to 600 μm inclusive and more preferably from 100 μm to 500 μm inclusive.

(Surface Layer)

For example, the surface layer contains a heat-resistant parting material (surface layer-forming material).

Examples of the heat-resistant parting material include fluorocarbon rubber, fluorocarbon resins, silicone resins, and polyimide resins.

Of these, fluorocarbon resins may be used as the heat-resistant parting material.

Specific examples of the fluorocarbon resin include tetrafluoroethylene/perfluoroalkyl vinyl ether copolymers (PFA), polytetrafluoroethylene (PTFE), tetrafluoroethylene/hexafluoropropylene copolymers (FEP), polyethylene/tetrafluoroethylene copolymers (ETFE), polyvinylidene fluoride (PVDF), polychlorotrifluoroethylene (PCTFE), and vinyl fluoride (PVF).

The surface layer has a thickness of 100 μm or less. The thickness is, for example, from S μm to 50 μm inclusive and preferably from 10 μm to 40 μm inclusive.

The surface layer may be formed using a well-known method and may be formed by a coating method.

The surface layer may be formed by preparing a tubular body serving as the surface layer in advance, forming a bonding layer on the inner surface of the tubular body, and covering the outer circumferential surface of the elastic layer with the tubular body. Alternatively, the surface layer may be formed by introducing functional groups such as vinyl groups onto the inner circumferential surface of a tubular body, covering the outer circumferential surface of the elastic body with the tubular body, and reacting the functional groups on the inner circumferential surface of the tubular body with functional groups on the outer circumferential surface of the elastic layer.

(Applications of Fixing Belt)

For example, the fixing belt according to the present exemplary embodiment is applicable to both a heating belt and a pressurizing belt. The heating belt may be a heating belt that uses electromagnetic induction for heating or may be a heating belt for which an external heat source for heating is used.

When the fixing belt according to the present exemplary embodiment is applied to a heating belt that uses electromagnetic induction for heating, a metal layer (heat generating layer) that generates heat by electromagnetic induction may be provided.

[Fixing Device]

A fixing device according to an exemplary embodiment can have various structures. One example of the fixing device includes a first rotatable member and a second rotatable member disposed in contact with the outer surface of the first rotatable member, wherein a recording medium having a toner image formed on its surface is inserted into a contact portion between the first rotatable member and the second rotatable member to fix the toner image. The fixing belt according to the preceding exemplary embodiment is applied to at least one of the first rotatable member and the second rotatable member.

A description will be given of a fixing device in a first exemplary embodiment that includes a heating roller and a pressurizing belt, a fixing device in a second exemplary embodiment that includes a heating belt and a heating roller, and an electromagnetic induction heating-type fixing device in a third exemplary embodiment that includes a heating belt and a heating roller. In the first and second exemplary embodiments, the fixing belt according to the preceding exemplary embodiment is applicable to both the heating belt and the pressurizing belt.

The fixing device according to the present exemplary embodiment is not limited to the fixing devices in the first to third exemplary embodiments and may be a fixing device including a pressurizing belt and one of a heating roller and a heating belt. The fixing belt according to the preceding exemplary embodiment is applicable to any of the heating belt and the pressurizing belt.

(First Exemplary Embodiment of Fixing Device)

Figure 2:
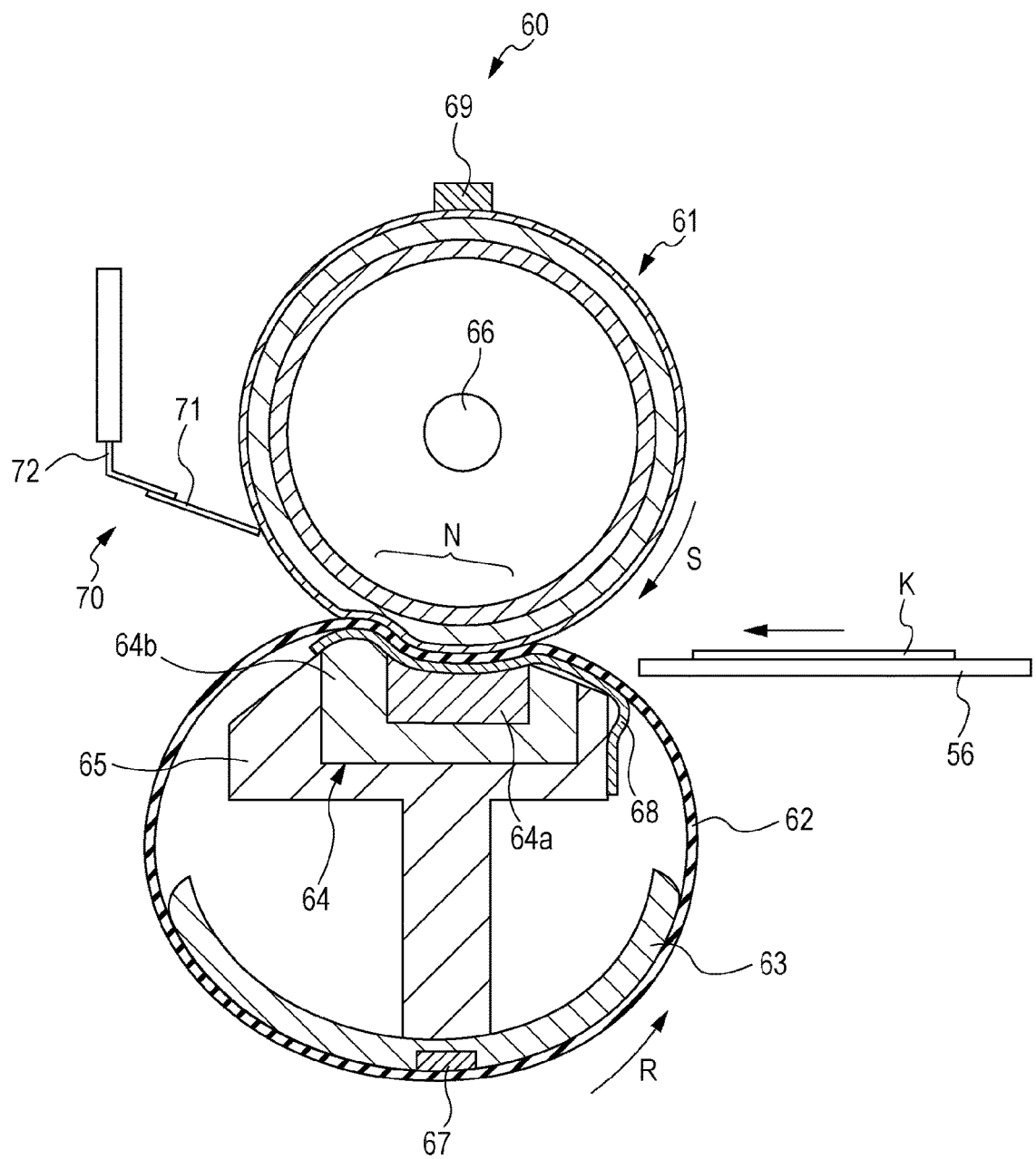
FIG. 2 is a schematic illustration showing an example of a fixing device according to a first exemplary embodiment.

The fixing device according to the first exemplary embodiment will be described. FIG. 2 is a schematic illustration showing an example of the fixing device according to the first exemplary embodiment.

As shown in FIG. 2, the fixing device 60 according to the first exemplary embodiment includes, for example, a heating roller 61 (an example of the first rotatable member) for rotation driving, a pressurizing belt 62 (an example of the second rotatable member), and a pressing pad 64 (an example of a pressing member) that presses the heating roller 61 through the pressurizing belt 62.

It is only necessary that the pressing pad 64 be disposed, for example, such that the pressurizing belt 62 and the heating roller 61 are pressed against each other. Therefore, the pressurizing belt 62 may be pressed against the heating roller 61, or the heating roller 61 may be pressed against the pressurizing belt 62.

A halogen lamp 66 (an example of heating means) is disposed inside the heating roller 61. The heating means is not limited to the halogen lamp, and any other heat-generating member that generates heat may be used.

For example, a temperature sensing element 69 is disposed in contact with a surface of the heating roller 61. The halogen lamp 66 is turned on or off based on the temperature value measured by the temperature sensing element 69, and the surface temperature of the heating roller 61 is thereby maintained at a target temperature (e.g., 150° C.)

The pressurizing belt 62 is rotatably supported, for example, by the pressing pad 64 and a belt-running guide 63 that are disposed on the inner side of the pressurizing belt 62. The pressurizing belt 62 is disposed so as to be pressed against the heating roller 61 by the pressing pad 64 at a nip part N.

For example, the pressing pad 64 is disposed so as to be pressed against the heating roller 61 through the pressurizing belt 62 on the inner side of the pressurizing belt 62, and the nip part N is formed between the pressing pad 64 and the heating roller 61.

The pressing pad 64 includes, for example: a front nipping member 64a disposed on the entrance side of the nip part N to provide the wide nip part N; and a release nipping member 64b disposed on the exit side of the nip part N to distort the heating roller 61.

To reduce the sliding resistance between the inner circumferential surface of the pressurizing belt 62 and the pressing pad 64, a sheet-shaped sliding member 68, for example, is disposed on surfaces of the front nipping member 64a and the release nipping member 64b that are in contact with the pressurizing belt 62. The pressing pad 64 and the sliding member 68 are held by a metallic holding member 65.

For example, the sliding member 68 is disposed such that its sliding surface is in contact with the inner circumferential surface of the pressurizing belt 62 and participates in supply and maintenance of oil between the sliding member 68 and the pressurizing belt 62.

For example, the belt-running guide 63 is attached to the holding member 65 to allow the pressurizing belt 62 to rotate.

The heating roller 61 is rotated in the direction of an arrow S by, for example, an unillustrated driving motor, and the pressurizing belt 62 is driven by the rotation of the heating roller 61 and rotates in the direction of an arrow R that is opposite to the rotation direction of the heating roller 61. Specifically, for example, the heating roller 61 rotates in the clockwise direction in FIG. 2, and the pressurizing belt 62 rotates in the counterclockwise direction.

A paper sheet K (an example of the recording medium) with an unfixed toner image thereon is guided by, for example, a fixation entrance guide 56 and transported to the nip part N. When the paper sheet K passes through the nip part N, the unfixed toner image on the paper sheet K is fixed by pressure and heat applied to the nip part N.

In the fixing device 60 according to the first exemplary embodiment, for example, the front nipping member 64a having a concave shape conforming to the outer circumferential surface of the heating roller 61 allows the nip part N to have a larger area than that without the front nipping member 64*a*.

In the fixing device 60 according to the first exemplary embodiment, for example, the release nipping member 64*b* is disposed so as to protrude toward the outer circumferential surface of the heating roller 61, so that the distortion of the heating roller 61 increases locally in an exit region of the nip part N.

When the release nipping member 64*b* is disposed as described above, the paper sheet K subjected to fixation passes through the portion with large local distortion during passage through a release nipping region, and therefore the paper sheet K is easily released from the heating roller 61.

For example, a release member 70 used as auxiliary release means is disposed downstream of the nip part N of the heating roller 61. The release member 70 is held, for example, by a holding member 72 such that a release claw 71 extending in a direction (counter direction) opposite to the rotation direction of the heating roller 61 is disposed close to the heating roller 61.

(Second Exemplary Embodiment of Fixing Device)

Figure 3:
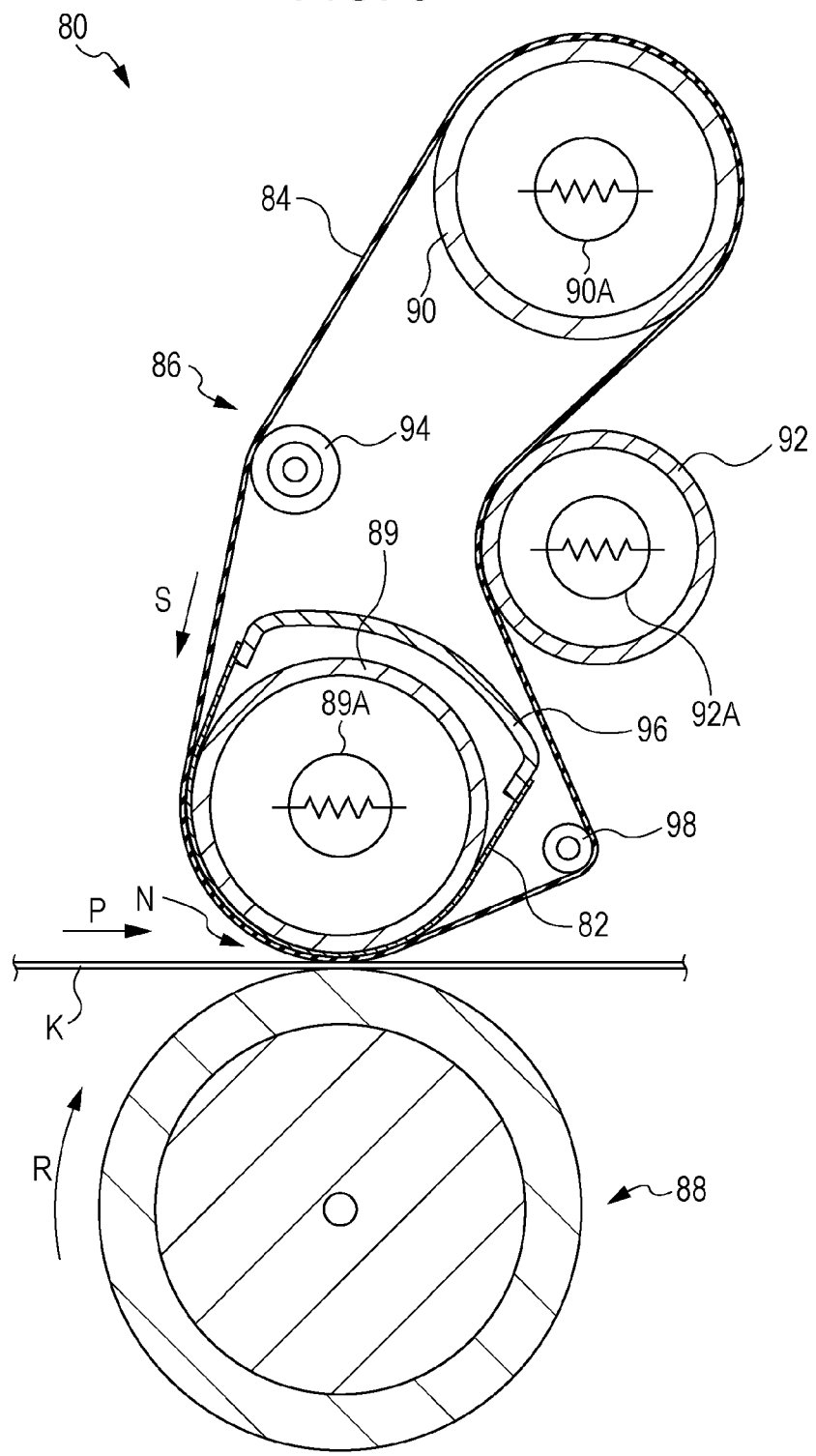
FIG. 3 is a schematic illustration showing an example of a fixing device according to a second exemplary embodiment.

The fixing device according to the second exemplary embodiment will be described. FIG. 3 is a schematic illustration showing an example of the fixing device according to the second exemplary embodiment.

As shown in FIG. 3, the fixing device 80 according to the second exemplary embodiment includes, for example: a fixing belt module 86 including a heating belt 84 (an example of the first rotatable member); and a pressurizing roller 88 (an example of the second rotatable member) pressed against the heating belt 84 (the fixing belt module 86). For example, a nip part N is formed in a contact portion between the heating belt 84 (the fixing belt module 86) and the pressurizing roller 88. In the nip part N, a paper sheet K (an example of the recording medium) is pressurized and heated, and a toner image is thereby fixed.

The fixing belt module 86 includes, for example: the endless heating belt 84; a heat-pressing roller 89 which is disposed on the side toward the pressurizing roller 88, around which the heating belt 84 is wound, and which is driven to rotate by the rotating force of a motor (not shown) and presses the inner circumferential surface of the heating belt 84 toward the pressurizing roller 88; and a support roller 90 that supports the heating belt 84 from its inner side at a position different from the heat-pressing roller 89.

The fixing belt module 86 further includes, for example: a support roller 92 that is disposed on the outer side of the heating belt 84 and determines a circulating path of the heating belt 84; a trajectory correction roller 94 that corrects the trajectory of the heating belt 84 in a region between the heat-pressing roller 89 and the support roller 90; and a support roller 98 that applies tension to the heating belt 84 from its inner circumferential side at a position downstream of the nip part N formed by the heating belt 84 and the pressurizing roller 88.

For example, the fixing belt module 86 is disposed such that a sheet-shaped sliding member 82 is disposed between the heating belt 84 and the heat-pressing roller 89.

For example, the sliding member 82 is disposed such that its sliding surface is in contact with the inner circumferential surface of the heating belt 84 and participates in supply and maintenance of oil between the sliding member 82 and the heating belt 84.

For example, the sliding member 82 is disposed such that its opposite ends are supported by a support member 96.

For example, a halogen heater 89A (an example of the heating means) is disposed inside the heat-pressing roller 89.

The support roller 90 is, for example, a cylindrical roller made of aluminum, and a halogen heater 90A (an example of the heating means) is disposed thereinside to heat the heating belt 84 from its inner circumferential side.

For example, spring members (not shown) that press the heating belt 84 outward are disposed at opposite ends of the support roller 90.

The support roller 92 is, for example, a cylindrical roller made of aluminum, and a release layer made of a fluorocarbon resin and having a thickness of 20 μm is formed on a surface of the support roller 92.

For example, the release layer on the support roller 92 is formed in order to prevent toner and paper powder on the outer circumferential surface of the heating belt 84 from being deposited on the support roller 92.

For example, a halogen heater 92A (an example of the heating means) is disposed inside the support roller 92 and heats the heating belt 84 from its outer circumferential side.

Specifically, for example, the heating belt 84 is heated by the heat-pressing roller 89, the support roller 90, and the support roller 92.

The trajectory correction roller 94 is, for example, a cylindrical roller made of aluminum, and an edge position measuring mechanism (not shown) that measures an edge position of the heating belt 84 is disposed near the trajectory correction roller 94.

For example, an axial position changing mechanism (not shown) that changes the axial contact position of the heating belt 84 according to the results of measurement by the edge position measuring mechanism is disposed in the trajectory correction roller 94, and meandering of the heating belt 84 is thereby controlled.

For example, the pressurizing roller 88 is rotatably supported and is pressed by urging means such as an unillustrated spring against a portion of the heating belt 84 that is wound around the heat-pressing roller 89. Therefore, as the heating belt 84 (the heat-pressing roller 89) of the fixing belt module 86 rotates and moves in the direction of an arrow S, the pressurizing roller 88 driven by the heating belt 84 (the heat-pressing roller 89) rotates and moves in the direction of an arrow R.

A paper sheet K with an unfixed toner image (not shown) placed thereon is transferred in the direction of an arrow P and guided to the nip part N of the fixing device 80. When the paper sheet K passes through the nip part N, the unfixed toner image on the paper sheet K is fixed by pressure and heat applied to the nip part N.

In the description of the fixing device 80 according to the second exemplary embodiment, the halogen heaters (halogen lamps) are used as examples of the plurality of heating means, but this is not a limitation. Heating elements other than the halogen heaters may be used. Examples of such heating elements include radiation lamp heating elements (heating elements that emit radiation such as infrared radiation) and resistance heating elements (heating elements in which an electric current is applied to a resistor to generate Joule heat: e.g., a heating element prepared by forming a film with resistance on a ceramic substrate and then firing the resulting substrate).

(Third Exemplary Embodiment of Fixing Device)

Figure 4:
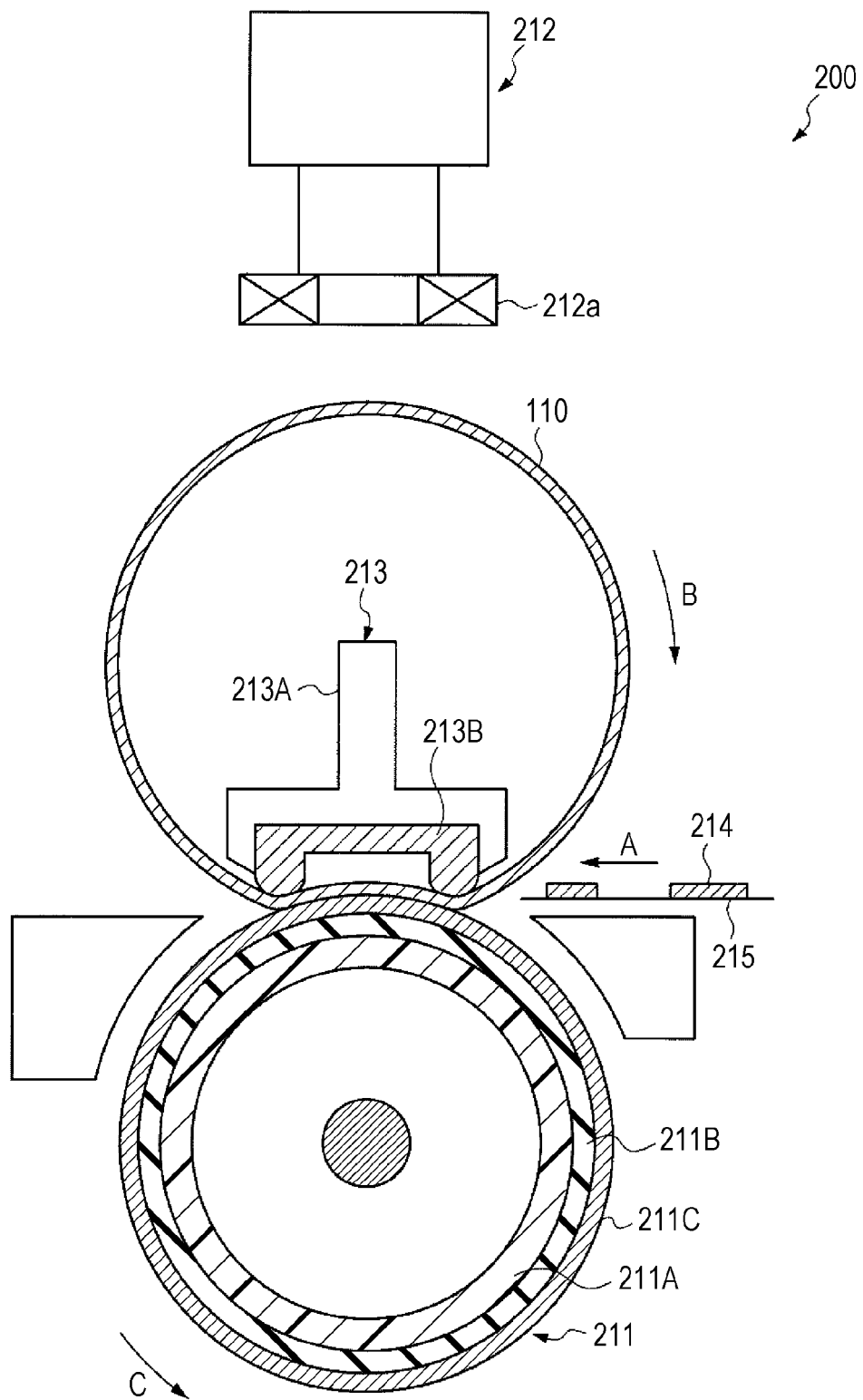
FIG. 4 is a schematic illustration showing an example of a fixing device according to a third exemplary embodiment.

The fixing device according to the third exemplary embodiment will be described. FIG. 4 is a schematic illustration showing an example of the fixing device according to the third exemplary embodiment.

The fixing device 200 according to the third exemplary embodiment is an electromagnetic induction type fixing device including a fixing belt 110 having a metallic layer. In the fixing device 200 according to the third exemplary embodiment, the fixing belt according to the preceding exemplary embodiment is used as the fixing belt 110.

As shown in FIG. 4, a pressurizing roller (pressurizing member) 211 is disposed so as to press part of the belt 110. From the viewpoint of efficient fixation, a contact region (nip) is formed between the fixing belt 110 and the pressurizing roller 211, and the belt 110 is curved so as to conform to the circumferential surface of the pressurizing roller 211. From the viewpoint of obtaining recording medium releasability, a curved portion is formed at a downstream end of the contact region (nip) such that the belt is curved.

The pressurizing roller 211 includes a base 211A, an elastic layer 211B made of, for example, silicone rubber and formed on the base 211A, and a release layer 211C made of a fluorine-based compound and formed on the elastic layer 211B.

A counter member 213 is disposed on the inner side of the belt 110 at a position facing the pressurizing roller 211. The counter member 213 is made of, for example, a metal, a heat-resistant resin, or heat-resistant rubber and includes: a pad 213B that is in contact with the inner circumferential surface of the belt 110 to increase pressure locally; and a support 13A that supports the pad 213B.

An electromagnetic induction heating device 212 including an electromagnetic induction coil (exciting coil) 212a installed therein is disposed at a position facing the pressurizing roller 211 (an example of the pressurizing member) with the belt 110 at the center. In the electromagnetic induction heating device 212, an AC current is applied to the electromagnetic induction coil, and the generated magnetic field is changed by an exciting circuit. An eddy current is thereby generated in the unillustrated metal layer (e.g., an electromagnetic induction metal layer) of the belt 110. The eddy current is converted to heat (Joule heat) by the electric resistance of the unillustrated metal layer, and heat is thereby generated on the surface of the belt 110.

The position of the electromagnetic induction heating device 212 is not limited to the position shown in FIG. 4. For example, the electromagnetic induction heating device 212 may be disposed on the upstream side, with respect to a rotation direction B, of the contact region of the belt 110 or may be disposed on the inner side of the belt 110.

In the fixing device 200 according to the third exemplary embodiment, a driving force is transmitted from a driving device to a gear fixed to an edge portion of the belt 110, and the belt 110 thereby rotates in the direction of an arrow B. As the belt 110 rotates, the pressurizing roller 211 rotates in the opposite direction, i.e., the direction of an arrow C.

A recording medium 215 with an unfixed toner image 214 formed thereon moves in the direction of an arrow A and passes through the contact region (nip) between the belt 110 and the pressurizing roller 211 in the fixing device 200. Pressure is applied to the unfixed toner image in a fused state, and the toner image is thereby fixed onto the recording medium 215.

[Image Forming Apparatus]

Next, an image forming apparatus according to an exemplary embodiment will be described.

The image forming apparatus according to the present exemplary embodiment includes: image holding members; charging means for charging the surfaces of the respective image holding members; electrostatic latent image forming means for forming electrostatic latent images on the charged surfaces of the respective image holding members; developing means for developing the electrostatic latent images formed on the image holding members with toner to form toner images; transferring means for transferring the toner images onto a surface of a recording medium; and fixing means for fixing the toner images onto the recording medium.

The fixing device according to the preceding exemplary embodiment is used as the fixing means.

In the image forming apparatus according to the present exemplary embodiment, the fixing device may be a cartridge detachable from the image forming apparatus. Specifically, the image forming apparatus according to the present exemplary embodiment may include the fixing device according to the preceding exemplary embodiment as a constituent device of a process cartridge.

The image forming apparatus according to the present exemplary embodiment will be described with reference to FIG. 5.

Figure 5:
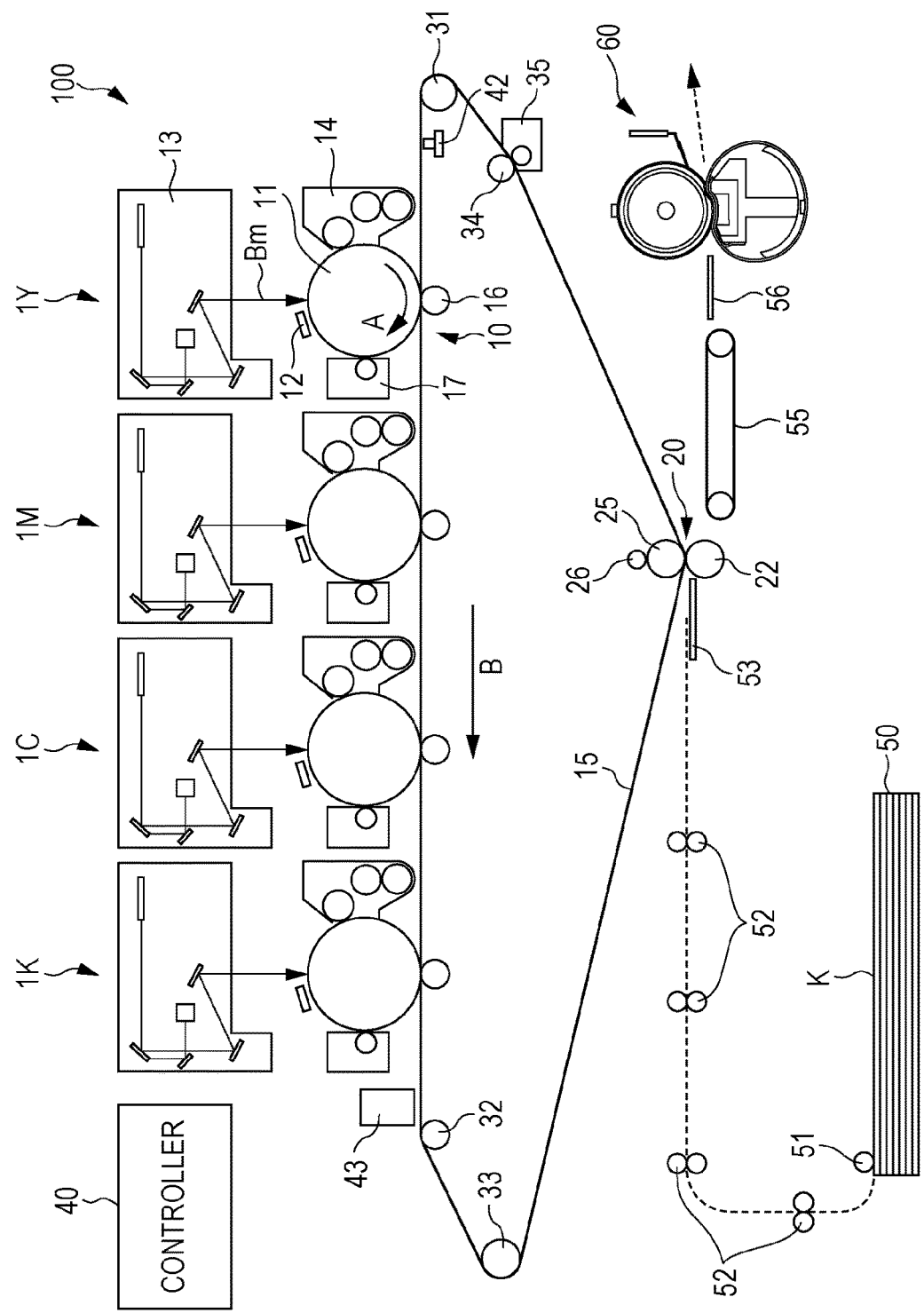
FIG. 5 is a schematic illustration showing an example of an image forming apparatus according to an exemplary embodiment.

FIG. 5 is a schematic illustration showing the structure of the image forming apparatus according to the present exemplary embodiment.

As shown in FIG. 5, the image forming apparatus 100 according to the present exemplary embodiment is, for example, an intermediate transfer type image forming apparatus having a so-called tandem configuration and includes: a plurality of image forming units 1Y, 1M, 1C, and 1K that form toner images of respective colors by an electrophotographic process; first transfer units 10 that transfer (first-transfer) the color toner images formed by the image forming units 1Y, 1M, 1C, and 1K sequentially onto an intermediate transfer belt 15; a second transfer unit 20 that transfers (second-transfers) all the superposed toner images transferred onto the intermediate transfer belt 15 at once onto a paper sheet K used as a recording medium; and a fixing device 60 that fixes the second-transferred images onto the paper sheet K. The image forming apparatus 100 further includes a controller 40 that controls the operation of each device (each unit).

The fixing device 60 is the above-described fixing device 60 according to the first exemplary embodiment. The image forming apparatus 100 may include the above-described fixing device 80 according to the second exemplary embodiment.

Each of the image forming units 1Y, 1M, 1C, and 1K of the image forming apparatus 100 includes a photoreceptor 11 that rotates in the direction of an arrow A and serves as an example of the image holding members each of which holds a toner image formed on its surface.

A charging unit 12 that charges the photoreceptor 11 and serves as an example of the charging means is disposed near the circumference of the photoreceptor 11. A laser exposure unit 13 serving as an example of the latent image forming means and used to write an electrostatic latent image on the photoreceptor 11 is disposed above the photoreceptor 11 (in FIG. 5, an exposure beam is denoted by symbol Bm).

A developer 14 that serves as an example of the developing means, contains color toner, and visualizes the electrostatic latent image on the photoreceptor 11 with the toner is disposed near the circumference of the photoreceptor 11, and a first transfer roller 16 is provided which transfers the color toner image formed on the photoreceptor 11 onto the intermediate transfer belt 15 in a corresponding first transfer unit 10.

A photoreceptor cleaner 17 that removes the toner remaining on the photoreceptor 11 is disposed near the circumference of the photoreceptor 11, and the electrophotographic devices including the charging unit 12, the laser exposure unit 13, the developer 14, the first transfer roller 16, and the photoreceptor cleaner 17 are sequentially arranged in the rotation direction of the photoreceptor 11. The image forming units 1Y, 1M, 1C, and 1K are arrange substantially linearly in the order of yellow (Y), magenta (M), cyan (C), and black (K) from the upstream side of the intermediate transfer belt 15.

The intermediate transfer belt 15 serving as an intermediate transfer body is formed from a film-shaped pressurizing belt that includes a base layer made of a resin such as polyimide or polyamide and contains an appropriate amount of an antistatic agent such as carbon black. The intermediate transfer belt 15 is formed so as to have a volume resistivity of from $10^6$ Ω·cm to $10^{14}$ Ω·cm inclusive, and its thickness is, for example, about 0.1 mm.

The intermediate transfer belt 15 is circulated (rotated) by various rollers in a direction B shown in FIG. 5 at a speed appropriate for its intended use. These rollers include: a driving roller 31 driven by a motor (not shown) excellent in constant speed property to rotate the intermediate transfer belt 15; a support roller 32 that supports the intermediate transfer belt 15 extending substantially linearly in the arrangement direction of the photoreceptors 11; a tension applying roller 33 that applies tension to the intermediate transfer belt 15 and serves as a correction roller for preventing meandering of the intermediate transfer belt 15; a back roller 25 disposed in the second transfer unit 20; and a cleaning back roller 34 disposed in a cleaning unit in which toner remaining on the intermediate transfer belt 15 is scraped off.

Each first transfer unit 10 includes a corresponding first transfer roller 16 facing a corresponding photoreceptor 11 with the intermediate transfer belt 15 therebetween. The first transfer roller 16 includes a core and a sponge layer serving as an elastic layer adhering to the circumference of the core. The core is a cylindrical rod made of a metal such as iron or SUS. The sponge layer is formed of a rubber blend of NBR, SBR, and EPDM with a conducting agent such as carbon black added thereto and is a sponge-like cylindrical roller having a volume resistivity of from $10^{7.5}$ Ω·cm to $10^{8.5}$ Ω·cm inclusive.

The first transfer roller 16 is disposed so as to be pressed against the photoreceptor 11 with the intermediate transfer belt 15 therebetween, and a voltage (first transfer bias) with polarity opposite to the charge polarity of toner (negative polarity, the same applies to the following) is applied to the first transfer roller 16. Therefore, the toner images on the photoreceptors 11 are electrostatically attracted to the intermediate transfer belt 15 in a sequential manner, and the toner images are superposed on the intermediate transfer belt 15.

The second transfer unit 20 includes the back roller 25 and a second transfer roller 22 disposed on the toner image holding surface side of the intermediate transfer belt 15.

The surface of the back roller 25 is formed from a tube made of a rubber blend of EPDM and NBR with carbon dispersed therein, and the inner portion of the back roller 25 is made of EPDM rubber. The back roller 25 is formed such that its surface resistivity is from $10^7$ Ω/square to $10^{10}$ Ω/square inclusive, and its hardness is set to, for example, 70° (the ASKER C manufactured by Kobunshi Keiki Co., Ltd., the same applies to the following). The back roller 25 is disposed on the back side of the intermediate transfer belt 15 and forms a counter electrode of the second transfer roller 22, and a metallic feeding roller 26 to which a second transfer bias is stably applied is disposed in contact with the back roller 25.

The second transfer roller 22 includes a core and a sponge layer serving as an elastic layer adhering to the circumference of the core. The core is a cylindrical rod made of a metal such as iron or SUS. The sponge layer is formed of a rubber blend of NBR, SBR, and EPDM with a conducting agent such as carbon black added thereto and is a sponge-like cylindrical roller having a volume resistivity of from $10^{7.5}$ Ω·cm to $10^{8.5}$ Ω·cm inclusive.

The second transfer roller 22 is disposed so as to be pressed against the back roller 25 with the intermediate transfer belt 15 therebetween. The second transfer roller 22 is grounded. The second transfer bias is formed between the second transfer roller 22 and the back roller 25, and the toner images are second-transferred onto a paper sheet K transferred to the second transfer unit 20.

An intermediate transfer belt cleaner 35 is disposed downstream of the second transfer unit 20 so as to be separable from the intermediate transfer belt 15. The intermediate transfer belt cleaner 35 removes toner and paper powder remaining on the intermediate transfer belt 15 after the second transfer to thereby clean the surface of the intermediate transfer belt 15.

The intermediate transfer belt 15, the first transfer units 10 (the first transfer rollers 16), and the second transfer unit 20 (the second transfer roller 22) correspond to examples of the transferring means.

A reference sensor (home position sensor) 42 that generates a reference signal used as a reference for image formation timings in the image forming units 1Y, 1M, 1C, and 1K is disposed upstream of the yellow image forming unit 1Y. When the reference sensor 42 detects a mark provided on the back side of the intermediate transfer belt 15, the reference sensor 42 generates the reference signal. The controller 40 issues instructions based on the reference signal to start image formation in the image forming units 1Y, 1M, 1C, and 1K.

An image density sensor 43 for image quality adjustment is disposed downstream of the black image forming unit 1K.

The image forming apparatus according to the present exemplary embodiment further includes, as transfer means for transferring a paper sheet K: a paper sheet container 50 that contains paper sheets K; a paper feed roller 51 that picks up and transfers the paper sheets K stacked in the paper sheet container 50 one by one at predetermined timing; transfer rollers 52 that transfer each paper sheet K fed by the paper feed roller 51; a transfer guide 53 that feeds the paper sheet K transferred by the transfer rollers 52 to the second transfer unit 20; a transfer belt 55 that transfers, to the fixing device 60, the paper sheet K transferred by the second transfer roller 22 after second transfer; and a fixation entrance guide 56 that guides the paper sheet K to the fixing device 60.

Next, a basic image forming process of the image forming apparatus according to the present exemplary embodiment will be described.

In the image forming apparatus according to the present exemplary embodiment, image data outputted from, for example, an unillustrated image reading device or an unillustrated personal computer (PC) is subjected to image processing in an unillustrated image processing device, and image forming operations are performed in the image forming units 1Y, 1M, 1C, and 1K.

In the image processing device, the inputted reflectance data is subjected to various types of image processing such as shading compensation, misregistration correction, lightness/color space transformation, gamma correction, frame erasure, and various types of image editing such as color editing and move editing. The image data subjected to the image processing is converted to four types of color tone data including Y color data, M color data, C color data, and K color data, and they are outputted to the respective laser exposure units 13.

In each of the laser exposure units 13, the photoreceptor 11 of a corresponding one of the image forming units 1Y, 1M, 1C, and 1K is irradiated with an exposure beam Bm emitted from, for example, a semiconductor laser according to the inputted color tone data. In each of the image forming units 1Y, 1M, 1C, and 1K, the surface of the photoreceptor 11 is charged by the charging unit 12 and is then scanned and exposed using the laser exposure unit 13, and an electrostatic latent image is thereby formed. The formed electrostatic latent images are developed in the respective image forming units 1Y, 1M, 1C, and 1K to thereby form Y, M, C, and K color images.

The toner images formed on the photoreceptors 11 of the image forming units 1Y, 1M, 1C, and 1K are transferred onto the intermediate transfer belt 15 in the first transfer units 10 in which the photoreceptors 11 come into contact with the intermediate transfer belt 15. More specifically, in each of the first transfer units 10, a voltage (first transfer bias) with polarity opposite to the charge polarity (negative polarity) of the toner is applied by the first transfer roller 16 to the base of the intermediate transfer belt 15. The toner images are thereby sequentially superposed onto the surface of the intermediate transfer belt 15, and the first transfer is completed.

After the toner images have been sequentially first-transferred onto the surface of the intermediate transfer belt 15, the intermediate transfer belt 15 moves, and the toner images are transferred toward the second transfer unit 20. When the toner images are conveyed toward the second transfer unit 20, the paper feed roller 51 in the transfer means starts rotating at the timing of conveyance of the toner images toward the second transfer unit 20 to feed a paper sheet K of the intended size from the paper sheet container 50. The paper sheet K fed by the paper feed roller 51 is conveyed by the transfer rollers 52 and reaches the second transfer unit 20 through the transfer guide 53. Before the paper sheet K reaches the second transfer unit 20, the paper sheet K is temporarily stopped. Then a registration roller (not shown) starts rotating at an appropriate timing determined by the movement of the intermediate transfer belt 15 with the toner images held thereon, and the position of the paper sheet K is thereby aligned with the position of the toner images.

In the second transfer unit 20, the second transfer roller 22 is pressed against the back roller 25 through the intermediate transfer belt 15. In this case, the paper sheet K transferred at the appropriate timing is pinched between the intermediate transfer belt 15 and the second transfer roller 22. Then, when a voltage (second transfer bias) with the same polarity as the charge polarity (negative polarity) of the toner is applied from the feeding roller 26, a transfer electric field is formed between the second transfer roller 22 and the back roller 25. All the unfixed toner images held on the intermediate transfer belt 15 are thereby electrostatically transferred at once onto the paper sheet K in the second transfer unit 20 in which the intermediate transfer belt 15 is pressed by the second transfer roller 22 and the back roller 25.

Then the paper sheet K with the toner images electrostatically transferred thereon is released from the intermediate transfer belt 15 and transferred by the second transfer roller 22 to the transfer belt 55 disposed downstream, with respect to the transfer direction of the paper sheet, of the second transfer roller 22. The transfer belt 55 transfers the paper sheet K to the fixing device 60 at an optimal transfer speed for the fixing device 60. The unfixed toner images on the paper sheet K transferred to the fixing device 60 are subjected to fixing processing using heat and pressure by the fixing device 60 and thereby fixed onto the paper sheet K. The paper sheet K with the fixed image formed thereon is transferred to an output sheet container (not shown) disposed in an output unit of the image forming apparatus.

After completion of transfer onto the paper sheet K, the toner remaining on the intermediate transfer belt 15 is transferred to the cleaning unit by the rotation of the intermediate transfer belt 15 and is removed from the intermediate transfer belt 15 by the cleaning back roller 34 and the intermediate transfer belt cleaner 35.

Although the exemplary embodiments have been described, the present disclosure should not be construed as being limited to the exemplary embodiments described above, and various modifications, changes, and improvements are possible.

EXAMPLES

The present disclosure will be specifically described by way of Examples. However, the present disclosure is not limited to the following Examples.

Example 1

A polyamic acid varnish (Type BP (manufactured by UNITIKA Ltd.)) which is a polyimide resin precursor prepared from 3,3',4, 4'-biphenyltetracarboxylic dianhydride and 4,4'-diaminodiphenyl ether and is capable of forming a foamed polyimide resin and a polyamic acid varnish (U imide CR (manufactured by UNITIKA Ltd.)) which is a polyimide resin precursor prepared from 3,3',4, 4'-biphenyltetracarboxylic dianhydride and 4,4'-diaminodiphenyl ether and is capable of forming a non-formed polyimide resin are mixed at a ratio adjusted so that a foaming ratio of 35% is obtained, to thereby prepare a varnish (1).

Graphene having a major axis of 0.5 μl (GNH-XZ (manufactured by Graphene Platform Corp.)) and serving as the flat-shaped heat transfer agent is added to the varnish (1) such that the amount of the graphene is 60 parts by mass based on 100 parts by mass of the solid polyimide resin after imidization. Then the varnish (1) containing the graphene is subjected to dispersion treatment by causing the vanish (1) to pass through an orifice with 0.1 mm at a pressure of 200 MPa five times using a wet jet mill (Genus PY manufactured by Genus).

Then the varnish (1) is added to the obtained dispersion such that the amount of the graphene is 20 parts by mass based on 100 parts by mass of the solid polyimide resin after imidization. To prevent the formation of Benard cells, a silicone-based surfactant (LS009 manufactured by Kusumoto Chemicals, Ltd.) is added to the dispersion such that the amount of the surfactant based on the mass of the dispersion is 0.5% by mass, and a polyimide resin precursor solution is thereby prepared.

Next, the polyimide resin precursor solution obtained is injected from a nozzle of ϕ3 mm onto the surface of an aluminum-made ϕ30 pipe rotated at 30 rpm. At the same time, while a SUS-made blade with a thickness t of 0.15 mm is pressed against the coating of the injected polyimide resin precursor solution to perform smoothing treatment, the pipe is moved in its axial direction at 100 mm/min. A coating of the polyimide resin precursor solution is thereby formed on the surface of the aluminum-made pipe. While the aluminum-made pipe is rotated at 10 rpm, the coating is dried at 120° C. for 20 minutes and then subjected to imidization at 330° C. for 30 minutes. After imidization, the coating is returned to room temperature and pulled out and cut, and a cylindrical base composed of the foamed polyimide resin layer with a diameter φ of 30 mm, a width of 330 mm, and a thickness of about 80 µm is thereby obtained.

Example 2

A cylindrical base composed of a foamed polyimide resin layer is obtained by the same procedure as in Example 1 except that graphene with a major axis of 3 µm (manufactured by XG Sciences) is used.

Example 3

A cylindrical base composed of a foamed polyimide resin layer is obtained by the same procedure as in Example 1 except that graphite with a major axis of 3 µm (BF-3AK manufactured by Chuetsu Graphite Works Co., Ltd.) is used instead of the graphene.

Example 4

A cylindrical base composed of a foamed polyimide resin layer is obtained by the same procedure as in Example 1 except that graphite with a major axis of 10 µm (CPB-6S manufactured by Chuetsu Graphite Works Co., Ltd.) is used instead of the graphene.

Example 5

The polyamic acid varnish (Type BP (manufactured by UNITIKA Ltd.)) which is a polyimide resin precursor prepared from 3,3',4, 4'-biphenyltetracarboxylic dianhydride and 4,4'-diaminodiphenyl ether and is capable of forming a foamed polyimide resin and a polyamic acid varnish (U imide AR manufactured by UNITIKA Ltd.) which is a polyimide resin precursor prepared from 3,3',4, 4'-biphenyltetracarboxylic dianhydride and p-phenylenediamine and capable of forming a non-formed polyimide resin are mixed at a ratio adjusted so that a foaming ratio of 35% is obtained, to thereby prepare a varnish (2).

A cylindrical base composed of a foamed polyimide resin layer is obtained by the same procedure as in Example 1 except that the varnish (2) is used and imidization is performed at 380° C.

Example 6

The polyamic acid varnish (Type BP (manufactured by UNITIKA Ltd.)) which is a polyimide resin precursor prepared from 3,3',4, 4'-biphenyltetracarboxylic dianhydride and 4,4'-diaminodiphenyl ether and is capable of forming a foamed polyimide resin and the polyamic acid varnish (U imide CR manufactured by UNITIKA Ltd.) which is a polyimide resin precursor prepared from 3,3',4, 4'-biphenyltetracarboxylic dianhydride and 4,4'-diaminodiphenyl ether and is capable of forming a non-formed polyimide resin are mixed at a ratio adjusted so that a foaming ratio of 60% is obtained, to thereby prepare a varnish (3).

A cylindrical base composed of a foamed polyimide resin layer is obtained by the same procedure as in Example 1 except that the varnish (3) is used.

Example 7

A cylindrical base composed of a foamed polyimide resin layer is obtained by the same procedure as in Example 6 except that the polyamic acid varnishes are mixed such that the amount of the graphene in the polyimide resin precursor solution is 10 parts by mass based on 100 parts by mass of the solid polyimide resin after imidization.

Examples 8 and 9

A cylindrical base composed of a foamed polyimide resin layer is obtained by the same procedure as in Example 1 except that the polyamic acid varnishes are mixed such that the amount of the graphene in the polyimide resin precursor solution is 50 or 60 parts by mass based on 100 parts by mass of the solid polyimide resin.

Example 10

The polyamic acid varnish (Type BP (manufactured by UNITIKA Ltd.)) which is a polyimide resin precursor prepared from 3,3',4, 4'-biphenyltetracarboxylic dianhydride and 4,4'-diaminodiphenyl ether and is capable of forming a foamed polyimide resin and the polyamic acid varnish (U imide CR (manufactured by UNITIKA Ltd.)) which is a polyimide resin precursor prepared from 3,3',4, 4'-biphenyltetracarboxylic dianhydride and 4,4'-diaminodiphenyl ether and is capable of forming a non-formed polyimide resin are mixed at a ratio adjusted so that a foaming ratio of 10% is obtained, to thereby prepare a varnish (4).

A cylindrical base composed of a foamed polyimide resin layer is obtained by the same procedure as in Example 1 except that the varnish (4) is used and the amount of the graphene in the polyimide resin precursor solution is 40 parts by mass based on 100 parts by mass of the solid polyimide resin.

Comparative Example 1

A cylindrical base composed of a non-foamed polyimide resin layer is obtained by the same procedure as in Example 1 except that a varnish (1) is used, which does not use the polyamic acid varnish (Type BP (manufactured by UNITIKA Ltd.)) that is a polyimide resin precursor prepared from 3,3',4, 4'-biphenyltetracarboxylic dianhydride and 4,4'-diaminodiphenyl ether and is capable of forming a foamed polyimide resin.

Comparative Example 2

A cylindrical base composed of a foamed polyimide resin layer is obtained by the same procedure as in Example 1 except that the amount of the graphene in the polyimide resin precursor solution is 10 parts by mass based on 100 parts by mass of the solid polyimide resin.

Comparative Example 3

A cylindrical base composed of a non-foamed polyimide resin layer is obtained by the same procedure as in Comparative Example 1 except that the amount of the graphene in the polyimide resin precursor solution is 40 parts by mass based on 100 parts by mass of the solid polyimide resin.

Evaluation

The cylindrical bases in the Examples composed of the respective polyimide resin layers are evaluated as follows.
(Various Types of Measurement)

The thermal conductivity and foaming ratio of each cylindrical base are measured by the methods described above.

(Frictional Force)

The frictional force on the inner circumferential surface of the cylindrical base in each Example is evaluated as follows.

A measurement specimen is cut from the cylindrical base. A surface of the measurement specimen that corresponds to the inner circumferential surface of the base is coated with 0.1 g/10 cm$^2$ of silicone oil (KF-96 50cs manufactured by Shin-Etsu Chemical Co., Ltd.).

Next, the measurement specimen is attached to the surface property tester type 14 (manufactured by Shinto Scientific Co., Ltd.) with the silicone oil-coated surface of the measurement specimen facing upward.

Next, a cuboidal urethane rubber probe with a hardness of 60°, a thickness of 3 mm, and a width of 20 mm is placed on the surface (the silicone oil-coated surface) of the measurement specimen such that the angle between the probe and the silicone oil-coated surface is 10°. With a vertical load of 200 g applied to the probe, the probe is pulled and moved a distance of 50 mm at a speed of 10 mm/s, and the average load during the movement is measured. This measurement procedure is repeated three times, and the arithmetic mean of the three measurements is used as the frictional force. The frictional force is evaluated according to the following criteria.

A (⊚): less than 150 gf
B (◯): less than 200 gf
C (x): 200 gf or more (Folding Endurance)

The folding endurance (fold number) of the cylindrical base in each Example is evaluated as follows.

A measurement specimen is obtained from the cylindrical base. The measurement specimen has an elongated shape (width 15 mm×length 150 mm) extending in the circumferential direction of the belt and is cut from the foamed resin layer (base).

Next, the measurement specimen obtained is subjected to folding endurance evaluation shown in JIS-P8115 (2001). In this evaluation, a load (tension) of 1 kgf is used, and the radius of curvature R of a bending portion (folding clamp) is changed in the range of 0.3 to 5 mm to change the bending stress applied to the measurement specimen. An S-N graph with the horizontal axis representing the fold number and the vertical axis representing the stress is produced, and the fold number when the bending stress is 100 MPa is determined. This fold number is used as the fold number of the foamed resin layer (base). The bending angle is 135° on one side, and the bending speed is 175 cycles/min.

The fold number is evaluated according to the following criteria.

A (⊚): The fold number is 10,000 or more.
B (◯): The fold number is 2,500 or more.
C (x): The fold number is less than 2,500.

(Fixation Ratio and Durability)

A 350 μm elastic layer using X-34-1972-3 A/B (manufactured by Shin-Etsu Chemical Co., Ltd.), a 20 μm bonding layer using KE-1950-10A/B, and a surface layer composed of a tetrafluoroethylene-perfluoroalkoxyethylene copolymer (PFA) layer and having an inner surface subjected to bonding treatment are sequentially formed on the outer circumferential surface of the cylindrical base obtained in each of the Examples and Comparative Examples. Fixing belts are thereby produced. In the fixing belts in these Examples, cells are exposed at their inner circumferential surface (i.e., the inner circumferential surface of the base).

—Fixation Ratio—

Figure 6:
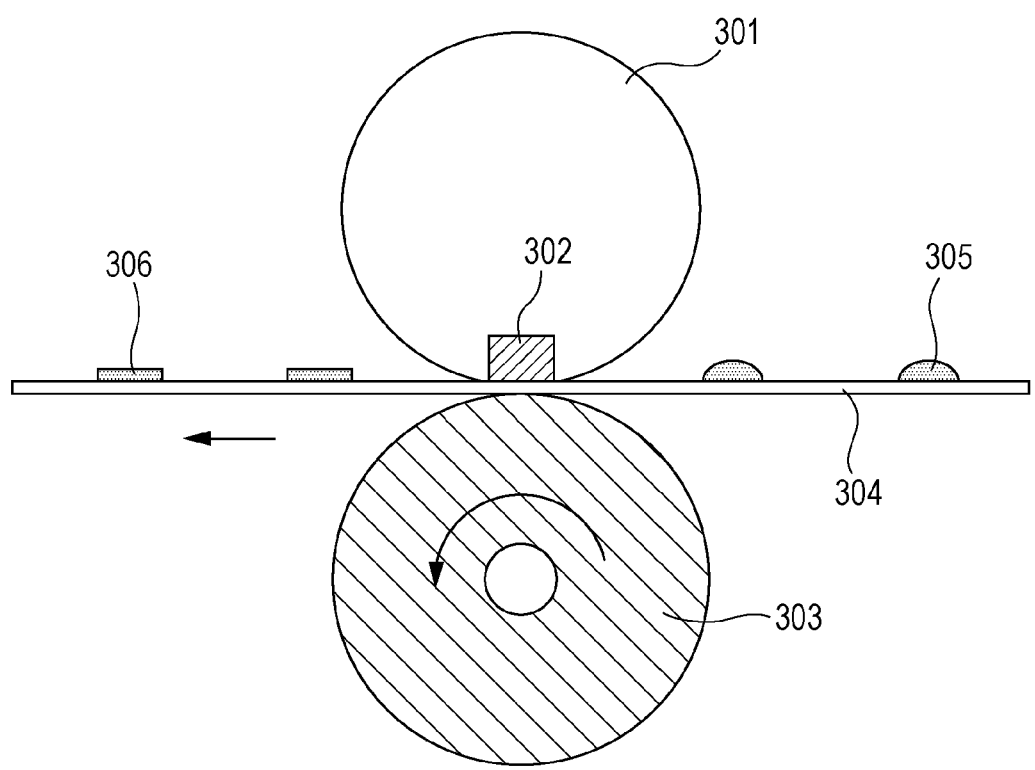
FIG. 6 is a schematic illustration showing a fixing device used for evaluation in Examples.

One of the fixing belts obtained is attached to a fixing device shown in FIG. 6. After unfixed toner is fixed using this fixing device, a tape peeling test is performed to evaluate the fixation ratio of the toner. Specifically, the following test is performed.

In the fixing device shown in FIG. 6, an unfixed toner image 305 on a paper sheet 304 is heated by heating means (heater) 302 through the fixing belt 301 and pressed by a pressurizing roller 303 to fix the image, and a fixed toner image (fixed image) 306 is thereby formed.

Then an adhesive tape (Scotch mending tape manufactured by 3M) is lightly applied to the fixed image formed by the fixing device shown in FIG. 6, and a linear pressure of 250 g/cm is applied to the tape to cause the tape to adhere to the image surface. Then the tape is peeled off. The absorbance of the image is measured before and after the tape is peeled off using a spectrocolorimeter (CM-3700d manufactured by KONICA MINOLTA, INC.). Specifically, the absorbance value is measured at a wavelength at which the absorbance of reflected light within the wavelength range of 400 nm to 800 nm is maximum, and the value of (the maximum absorbance after the tape is peeled off)/(the maximum absorbance before the tape is peeled off)×100 is used as the fixation ratio.

The criteria of evaluation are as follows.

A (⊚): 95% or more
B (◯): 90% or more and less than 95%
C (x): less than 90%

—Durability—

The fixing device shown in FIG. 6 is used to evaluate durability. Specifically, paper sheets are continuously caused to pass through the device.

The criteria of evaluation are as follows.

A (⊚): The base is not broken and follows the rotation of the pressurizing roller even when the number of sheets used is 400,000.
B (◯): The base is broken or does not follow the rotation of the pressurizing roller when the number of sheets used is 250,000 or more and less than 400,000.
C (x): The base is broken or does not follow the rotation of the pressurizing roller when the number of sheets used is less than 250,000.

The details of the Examples are listed in Tables 1 and 2.

In the tables, the ratio of the heat transfer agent added (phr) represents the number of parts of the heat transfer agent based on 100 parts by mass of the polyimide resin.

TABLE 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Resin | Polyimide BPDA-ODA | Polyimide BPDA-ODA | Polyimide BPDA-ODA | Polyimide BPDA-ODA | Polyimide BPDA-ODA/PDA | Polyimide BPDA-ODA | Polyimide BPDA-ODA | Polyimide BPDA-ODA | Polyimide BPDA-ODA | Polyimide BPDA-ODA |
| Heat transfer agent (Major axis T1) | Graphene 0.5 μm | Graphene 3 μm | Graphite 3 μm | Graphite 10 μm | Graphene 0.5 μm | Graphene 0.5 μm | Graphene 0.5 μm | Graphene 0.5 μm | Graphene 0.5 μm | Graphene 0.5 μm |

TABLE 1-continued

|  | Example 1 Polyimide BPDA-ODA | Example 2 Polyimide BPDA-ODA | Example 3 Polyimide BPDA-ODA | Example 4 Polyimide BPDA-ODA | Example 5 Polyimide BPDA-ODA/PDA | Example 6 Polyimide BPDA-ODA | Example 7 Polyimide BPDA-ODA | Example 8 Polyimide BPDA-ODA | Example 9 Polyimide BPDA-ODA | Example 10 Polyimide BPDA-ODA |
|---|---|---|---|---|---|---|---|---|---|---|
| Resin |  |  |  |  |  |  |  |  |  |  |
| Ratio of heat transfer agent added | 20 phr | 20 phr | 20 phr | 20 phr | 20 phr | 20 phr | 10 phr | 50 phr | 60 phr | 40 phr |
| Foaming ratio | 35% | 35% | 35% | 35% | 35% | 60% | 60% | 35% | 35% | 10% |
| Ratio of closed cells | 88% | 84% | 83% | 80% | 86% | 88% | 89% | 85% | 82% | 81% |
| Thermal conductivity W/m·k | 0.69 | 0.60 | 0.55 | 0.62 | 0.75 | 0.91 | 0.65 | 0.95 | 1.05 | 0.51 |
| Folding endurance (fold number) | 125400 A(⊙) | 25300 A(⊙) | 8700 B(○) | 3200 B(○) | 7800 B(○) | 2800 B(○) | 5400 B(○) | 2800 B(○) | 1400 C(x) | 4300 B(○) |
| Frictional force gf | 105 A(⊙) | 110 A(⊙) | 98 A(⊙) | 124 A(⊙) | 100 A(⊙) | 84 A(⊙) | 75 A(⊙) | 102 A(⊙) | 98 A(⊙) | 165 B(○) |
| Fixation ratio % | 95 A(⊙) | 94 B(○) | 93 B(○) | 94 B(○) | 95 A(⊙) | 97 A(⊙) | 93 B(○) | 97 A(⊙) | 98 A(⊙) | 91 B(○) |
| Durability | A(⊙) | A(⊙) | B(○) | B(○) | B(○) | B(○) | B(○) | B(○) | C(x) | B(○) |

TABLE 2

|  | Comparative Example 1 | Comparative Example 2 | Comparative Example 3 |
|---|---|---|---|
| Resin | Polyimide BPDA-ODA | Polyimide BPDA-ODA | Polyimide BPDA-ODA |
| Heat transfer agent (Major axis T1) | Graphene 0.5 μm | Graphene 0.5 μm | Graphene 0.5 μm |
| Ratio of heat transfer agent added | 20 phr | 10 phr | 40 phr |
| Foaming ratio | 0% | 35% | 0% |
| Ratio of closed cells | 0% | 81% | 0% |
| Thermal conductivity W/m·k | 0.35 | 0.38 | 0.42 |
| Folding endurance (fold number) | 54300 A(⊙) | 156300 A(⊙) | 2400 C(x) |
| Frictional force gf | 215 C(x) | 108 A(⊙) | 220 C(x) |
| Fixation ratio % | 85 C(x) | 87 C(x) | 89 C(x) |
| Durability | C(x) | A(⊙) | C(x) |

As can be seen from the above results, the fixing belts obtained using the bases in the Examples have higher thermal conductivity in the direction of the belt thickness than the fixing belts obtained using the bases in the Comparative Examples. As can be seen, the fixing belts obtained using the bases in the Examples are excellent in folding endurance, slidability of their inner circumferential surfaces (low frictional force on the inner circumferential surface), fixation ratio, and durability.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A fixing belt comprising a base composed of a foamed resin layer which contains a flat-shaped heat transfer agent and whose thermal conductivity in a direction of the thickness of the belt is 0.5 W/(m·K) or more.

2. The fixing belt according to claim 1, wherein the flat-shaped heat transfer agent is at least one of graphene and graphite.

3. The fixing belt according to claim 1, wherein the flat-shaped heat transfer agent has an aspect ratio (a major axis/a thickness) of 10 or more.

4. The fixing belt according to claim 1, wherein the foamed resin layer is a foamed polyimide-based resin layer.

5. The fixing belt according to claim 2, wherein the foamed resin layer is a foamed polyimide-based resin layer.

6. The fixing belt according to claim 1, wherein the foamed resin layer has a foaming ratio of from 30% to 65% inclusive.

7. The fixing belt according to claim 6, wherein the foaming ratio of the foamed resin layer is from 35% to 60% inclusive.

8. The fixing belt according to claim 1, wherein the foamed resin layer is a closed-cell foamed resin layer.

9. The fixing belt according to claim 8, wherein the ratio of closed cells in the closed-cell foamed resin layer is 80% or more.

10. The fixing belt according to claim 1, wherein the fold number of the base composed of the foamed resin layer is 2,500 or more.

11. The fixing belt according to claim 1, wherein cells are exposed at an inner circumferential surface of the base composed of the foamed resin layer.

12. A fixing device comprising:
a first rotatable member; and
a second rotatable member disposed in contact with an outer surface of the first rotatable member,
wherein at least one of the first rotatable member and the second rotatable member is the fixing belt according to claim 1.

13. A process cartridge comprising
the fixing device according to claim 12,
wherein the process cartridge is attached to and detached from an image forming apparatus.

14. An image forming apparatus comprising:
an image holding member;
a charging unit that electrostatically charges a surface of the image holding member;
a latent image forming unit that forms a latent image on the charged surface of the image holding member;
a developing unit that develops the latent image with toner to form a toner image;

a transfer unit that transfers the toner image onto a recording medium; and a fixing unit that fixes the toner image onto the recording medium, the fixing unit being the fixing device according to claim 12.

* * * * *